(12) United States Patent
Perrow

(10) Patent No.: US 6,390,925 B1
(45) Date of Patent: May 21, 2002

(54) RETAINER ASSEMBLY

(75) Inventor: Scott Jay Perrow, Freeland, MI (US)

(73) Assignee: Delphi Technologies, Inc., Troy, MI (US)

( * ) Notice: Subject to any disclaimer, the term of this patent is extended or adjusted under 35 U.S.C. 154(b) by 32 days.

(21) Appl. No.: 09/688,507

(22) Filed: Oct. 16, 2000

(51) Int. Cl.⁷ .............................. F16D 3/26; B25G 3/28
(52) U.S. Cl. ................ 464/111; 464/905; 464/906; 403/316; 403/359.1
(58) Field of Search .................. 464/111, 139, 464/140, 141, 142, 143, 144, 146, 145, 906, 905, 112, 120, 115; 403/315, 316, 317, 359.1, 329, 326

(56) References Cited

U.S. PATENT DOCUMENTS

| | | | | |
|---|---|---|---|---|
| 1,917,987 A | * | 7/1933 | Large ...................... 403/326 |
| 2,987,897 A | * | 6/1961 | Spence ..................... 464/146 |
| 3,832,076 A | * | 8/1974 | Gehrke ..................... 403/359 |
| 3,909,920 A | * | 10/1975 | Cornish et al. ............. 403/326 |
| 4,124,318 A | * | 11/1978 | Sagady ..................... 403/359 |
| 4,516,957 A | | 5/1985 | Chyz et al. |
| 4,813,808 A | * | 3/1989 | Gehrke ..................... 464/146 |
| 5,692,961 A | * | 12/1997 | Turner ..................... 464/146 |
| 5,807,180 A | * | 9/1998 | Knodle et al. .............. 464/144 |

* cited by examiner

Primary Examiner—Lynne H. Browne
Assistant Examiner—Kenn Thompson
(74) Attorney, Agent, or Firm—Edmund P. Anderson

(57) ABSTRACT

A retainer assembly is provided for attaching a splined shaft with a splined hub. The retainer assembly is particularly useful in a constant velocity joint to attach the halfshaft with an inner hub (either an inner race or spider assembly). The retainer comprises specifically designed grooves at the outboard end of the splined shaft and splined bore of the hub. The grooves are located outside of the splined area. A retaining ring is also provided. The retaining ring has a specific geometry that includes a pair of opposing legs that are integrally connected to provide a v-shaped cross section and are flexible with respect to one another. The first of the legs of the retaining ring engages the groove on the shaft and the second of the legs engages the groove on the hub to prevent relative axial movement between the shaft and the hub when in the retained position. A method of assembling the retainer is also provided.

25 Claims, 4 Drawing Sheets

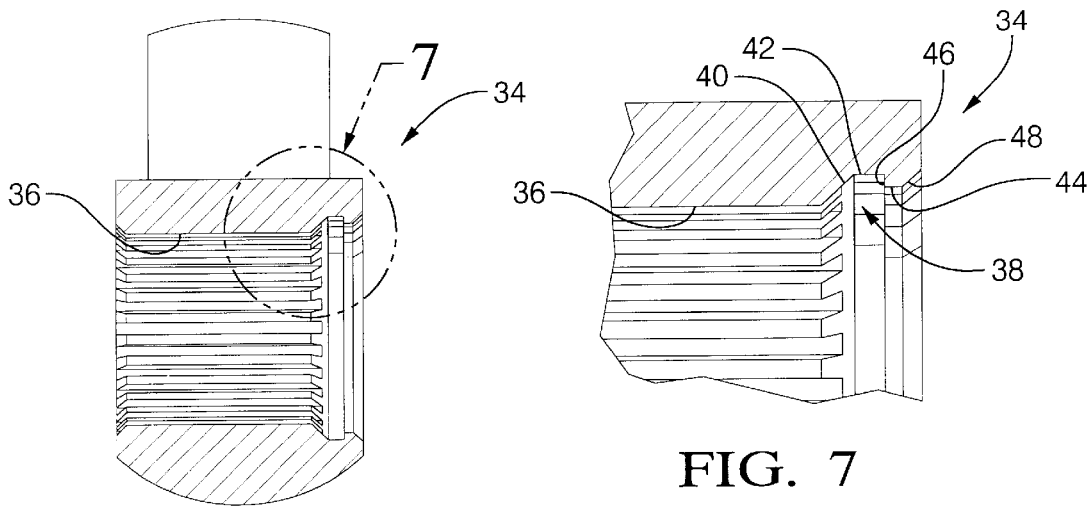
FIG. 6
FIG. 7
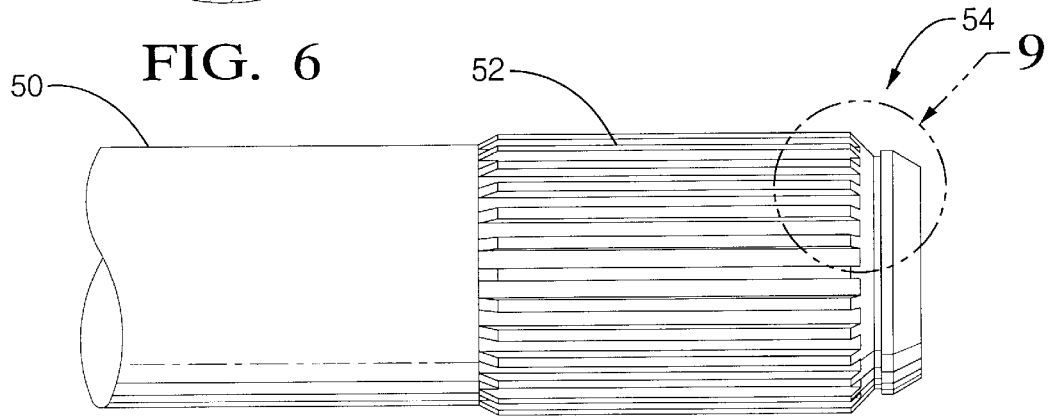
FIG. 8
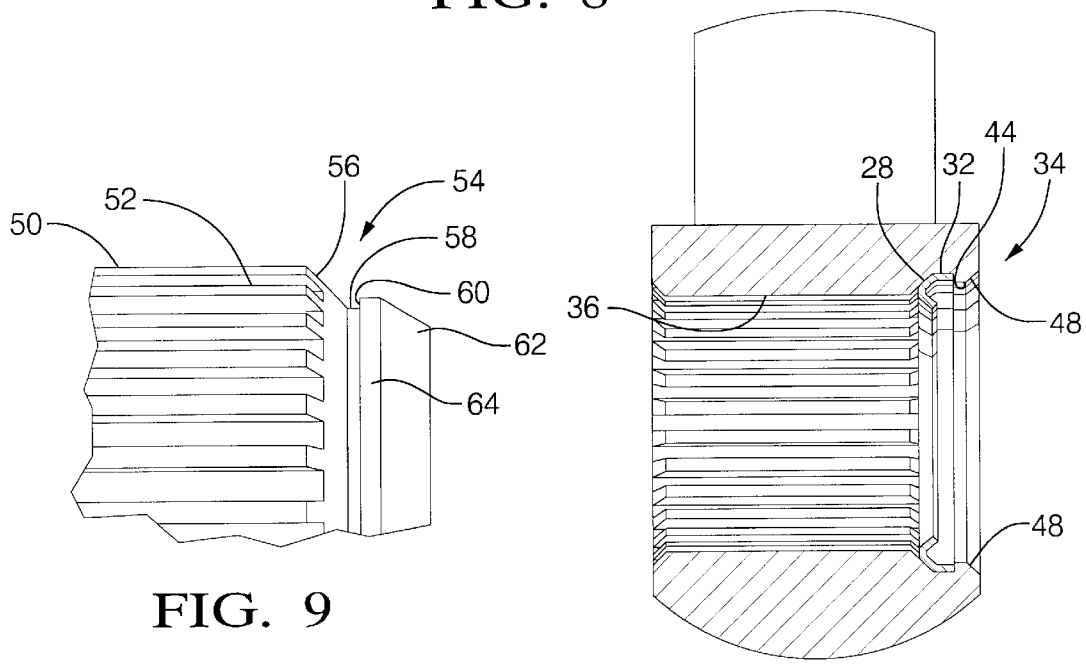
FIG. 9
FIG. 10

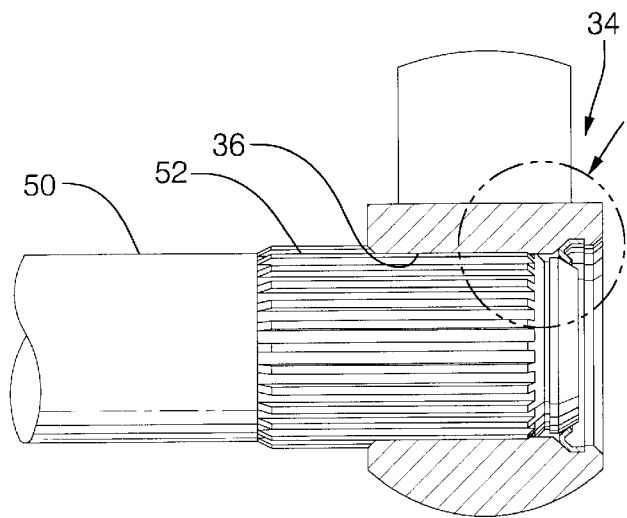
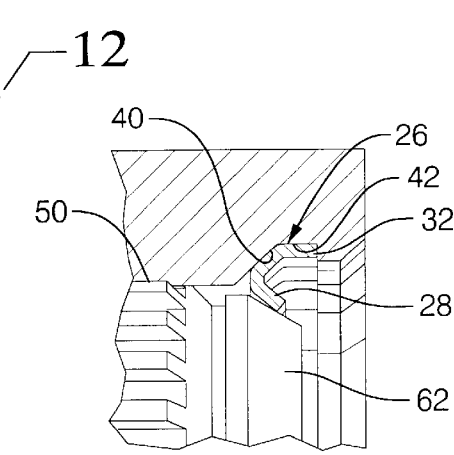
FIG. 11  FIG. 12
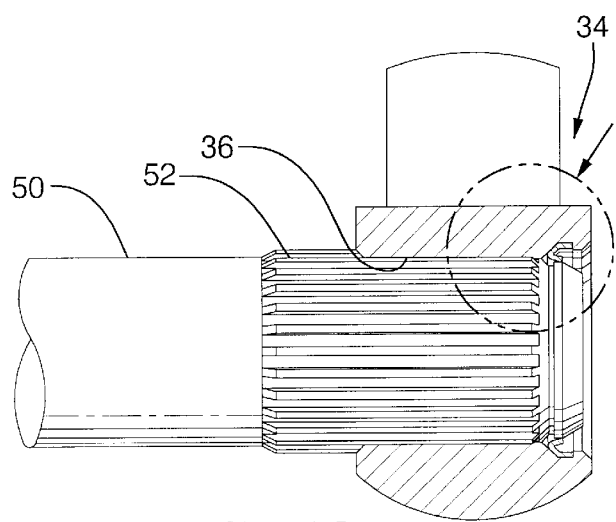
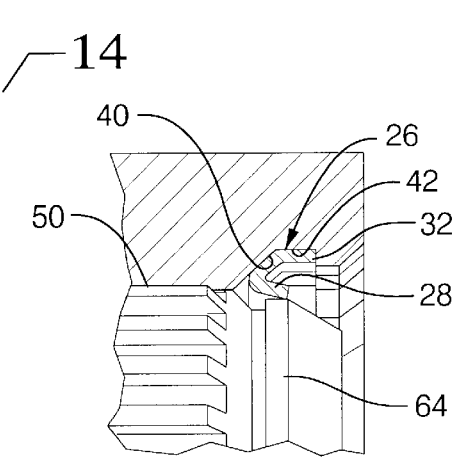
FIG. 13  FIG. 14
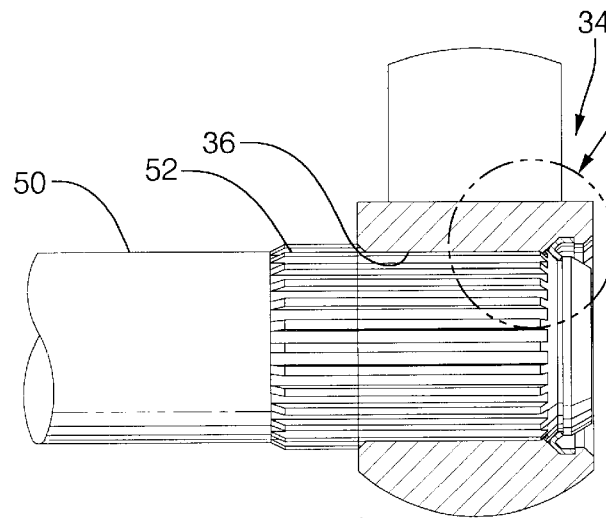
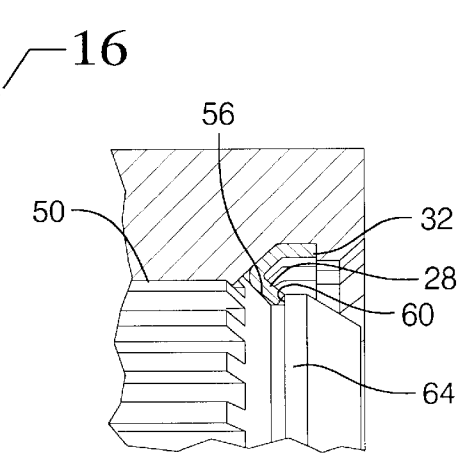
FIG. 15  FIG. 16

RETAINER ASSEMBLY

TECHNICAL FIELD

The present invention relates to a retainer assembly and method for axially fixing a splined hub on a splined shaft. More specifically, the present invention relates to a novel retainer ring and groove assembly used to secure a splined shaft and splined hub in a constant velocity joint.

BACKGROUND OF THE INVENTION

The present invention relates to an improved retainer system and method of assembly for use in connection with attaching a splined shaft with a splined hub. The primary use for the invention is in connection with constant velocity joints in vehicles.

Typically such joints include a halfshaft bar. This halfshaft has ends that are splined and grooved male type ends. The halfshaft is typically connected to an inboard joint and an outboard joint, as is well known in the art. The inboard and outboard joints may take any well-known design, such as for example, a Rzeppa joint or a Tripot joint. Each of these designs contains an inner hub that has a female splined portion for receiving the splined half shaft. As with the male splined shaft, the female splined hub includes a groove. The grooves on the hub and on the splined shaft receive a retaining ring for securing the shaft in the hub to prevent axial movement therebetween.

Currently, the retaining ring designs include a double ring design for use in the Tripot type joint, the spot face design for use in a Rzeppa type joint and a buried ring design.

The double ring design as shown, for example, in U.S. Pat. No. 4,516,957 to Chyz et al requires a groove in the torque zone of the splined shaft, which can reduce torsional fatigue life.

The spot face design requires a spot face geometry on the inner race, which is an added expense and a groove in the torque zone of the splined shaft as described above.

The buried ring design solves some of the above problems but the ring groove is positioned in the middle of the spline engagement creating an interrupted spline condition. The buried ring design also causes an assembly problem due to the deep groove geometry on the splined shaft. The deep groove also causes fabrication problems in connection with the heat treatment necessary to produce the splined shaft.

SUMMARY OF THE INVENTION

According to the present invention, there is provided a retainer for the interior assembly of a universal joint comprising a shaft having a splined portion and having an external groove. The groove includes a flared wall surface extending at an angle relative to the splined portion and a bottom surface extending from the flared wall surface. The retainer further includes a hub member defining a bore having splines. The hub member is adapted for mating engagement with the splined portion of said shaft. The hub member defines an internal groove including a flared wall extending outwardly from the bore at an angle relative thereto and an annular groove portion extending from the flared wall. The retainer further includes a retaining ring. The retaining ring has first and second legs that are flexible with respect to each other. The first leg engages the flared wall surface of the shaft. The second leg engages the flared wall of the hub to thereby prevent relative axial movement between the hub and the shaft.

A method of inserting a splined shaft into a splined hub is also provided. The method comprises the steps of providing a shaft having a splined portion thereon and an external groove outward of the splined portion. The method further includes the step of providing a hub member defining a bore and having splines. The hub includes an internal groove outward of the splines. A retaining ring having first and second legs is placed into the internal groove of the hub such that the second leg depends downwardly therefrom and into the bore.

The shaft is inserted into the hub member such that the splined portion of the shaft fully engages the splines of the bore prior to engagement of the retaining ring in the external groove of the shaft. The shaft is further inserted into the hub such that the shaft engages the first leg of the retaining ring and deflects the first leg relative to the second leg. Insertion of the shaft is continued until the first leg engages the external groove of said shaft.

It is an object of the present invention to move the retaining ring outboard of the splined area of both the shaft and hub and thus out of the torque zone.

It is another object of the present invention to provide a retainer that allows for spline engagement between the shaft and hub before the retaining ring engages.

It is another object of the present invention to allow for full spline engagement (with no interrupt) between the splined shaft and hub.

It is another object of the present invention to provide relatively shallow groove geometry to eliminate manufacturing problems particularly associated with heat treatment.

It is another object of the present invention to provide a retaining ring design that eliminates the problem of ring droop (which can occur during assembly).

It is another object of the present invention to provide a retaining ring design that allows for disassembly at a predefined load, allowing the retaining ring to sheer into two or more pieces without causing damage to the grooves.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 6 is a cross-sectional view of an inner hub made in accordance with the present invention;

FIG. 7 is an exploded view of the section of FIG. 6 showing the groove design;

FIG. 8 is an end view of a splined shaft made in accordance with the present invention;

FIG. 9 is an exploded view of the section of FIG. 8 showing the groove design;

FIG. 10 is a cross sectional view of an inner hub containing the retaining ring therein;

FIG. 11 is a plan view of the assembly partially in cross section showing the shaft prior to its being fixed to the hub;

FIG. 12 is an exploded view of the section of FIG. 11 showing the grooves and retaining ring FIG. 13 is a plan view of the assembly partially in cross section showing the shaft being inserted further into the hub;

FIG. 14 is an exploded view of the section of FIG. 13 showing the grooves and retaining ring;

FIG. 15 is a plan view of the assembly partially in cross section showing the shaft being fully inserted into the hub and locked with respect thereto; and FIG. 16 is an exploded view of the section of FIG. 15 showing the grooves and retaining ring.

DETAILED DESCRIPTION OF THE DRAWINGS

Figure 1:
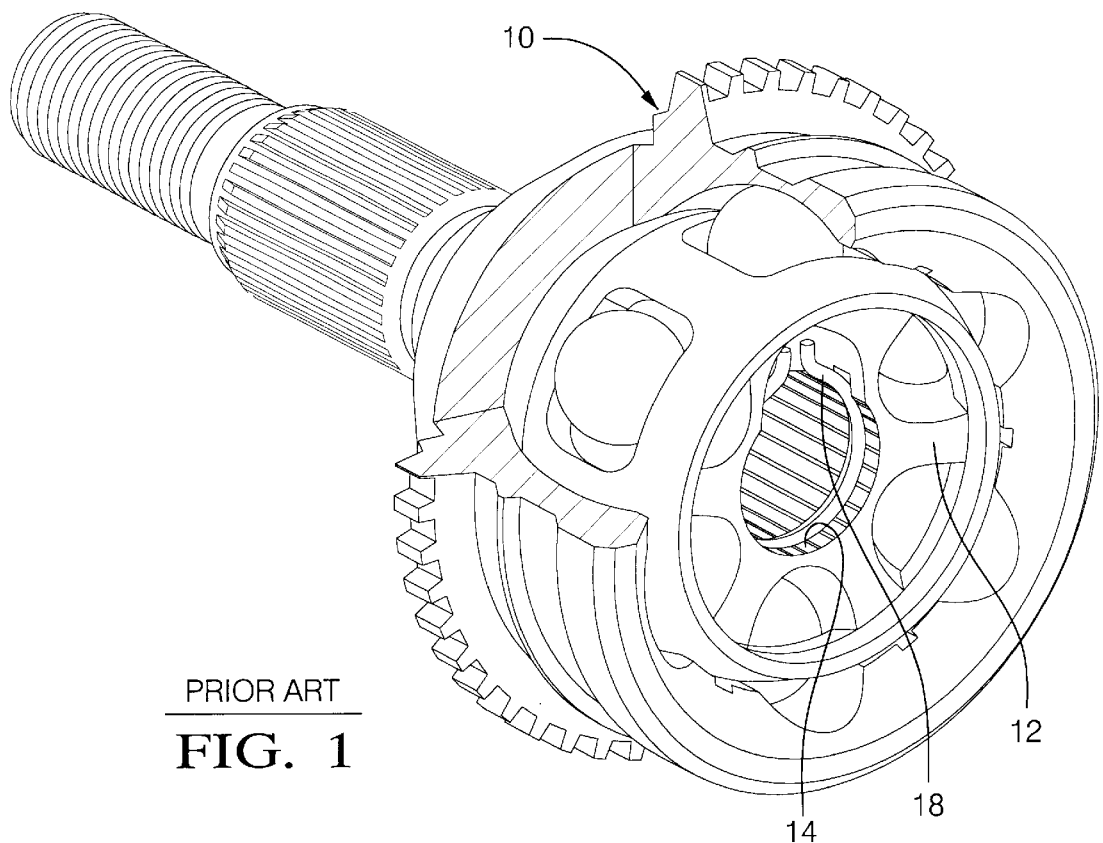
FIG. 1 is a perspective view of a prior art Rzeppa type joint showing a prior retainer ring design.

A commonly known Rzeppa type constant velocity joint is generally shown at 10 in FIG. 1. The joint 10 includes an inner hub or inner race 12. The inner race 12 includes a female splined bore 14 that extends in the axial direction of the inner race 12. The splined bore 14 receives a male splined shaft (not shown) commonly known as a halfshaft.

Figure 2:
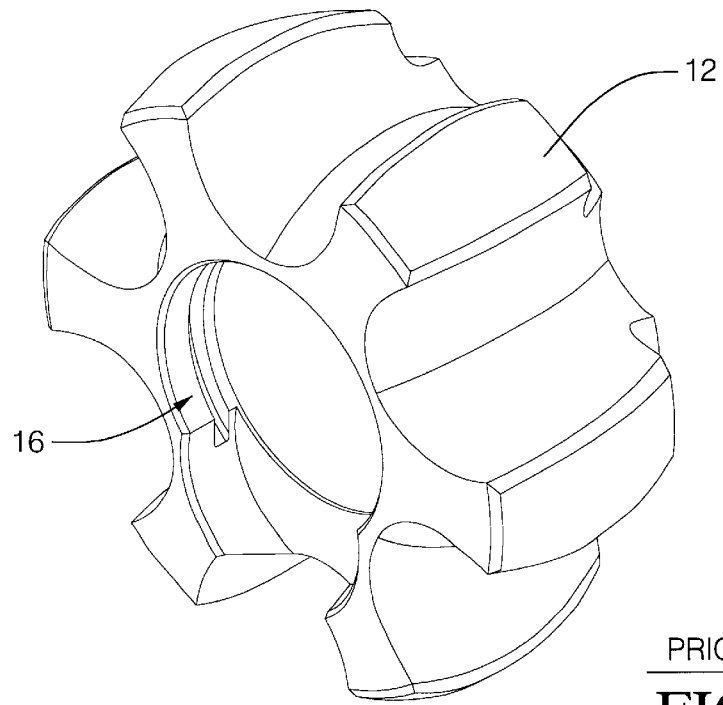
FIG. 2 is a perspective view of the inner hub of the joint of FIG. 1.

The inner race 12 includes a groove generally shown at 16 (best seen in FIG. 2) for receiving a retaining ring 18. The halfshaft also includes a groove in the spline area. Once the halfshaft is inserted into the splined bore 14, the retaining ring 18 is placed in the groove of the halfshaft and locks the halfshaft with the inner race 12 to prevent relative axial movement therebetween.

Figure 3:
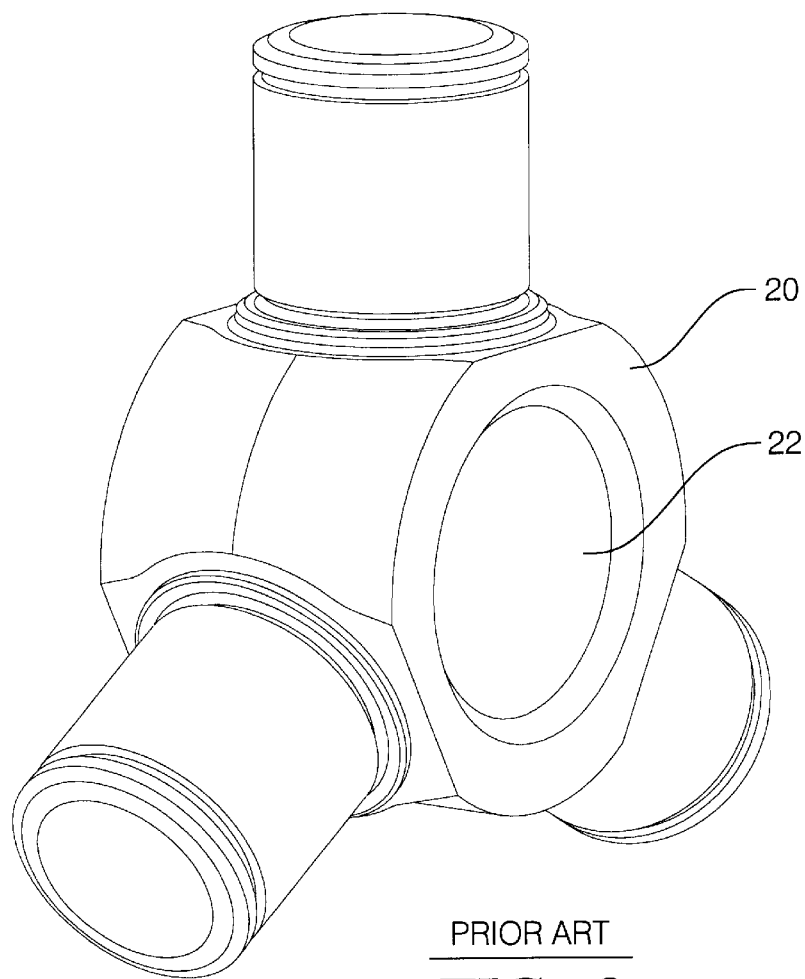
FIG. 3 is a perspective view of the inner hub of a Tripot type joint showing a prior groove design.

FIG. 3 shows an inner hub or spider assembly 20 of a Tripot type joint. Tripot type constant velocity joints are well known in the art. The spider assembly 20 includes a splined bore 22. As above, the splined bore 22 receives the splined halfshaft. The spider can be retained to the halfshaft bar by two external retaining rings that are located at each end of the spider body.

Figure 4:
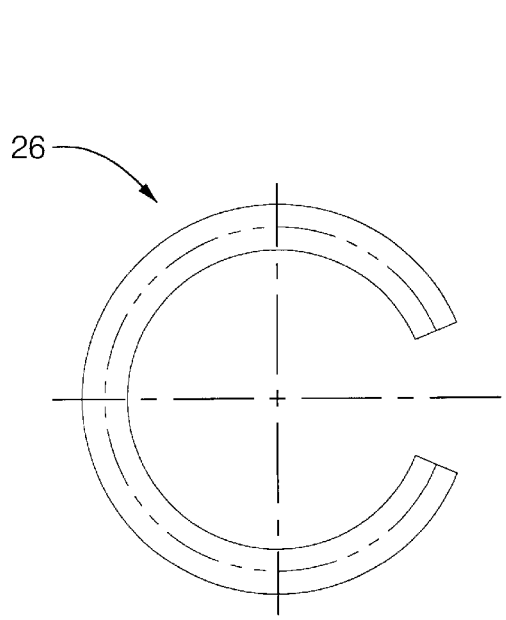
FIG. 4 is a plan view of a retainer ring in accordance with the present invention.

The present invention relates to an improved retainer system for use in constant velocity joints. In general, the retainer system comprises an improved retaining ring, as best shown in FIGS. 4 and 5 and improved groove geometries in the inner hub (FIGS. 6 and 7) and in the splined shaft (FIGS. 8 and 9).

More specifically, an improved retaining ring is generally shown at 26. The retaining ring 26 is preferably fabricated from flat spring stock sheet material (e.g., spring steel) and preformed to a generally C-shape as best seen in FIG. 4 when in a relaxed free state. The C-shape allows for elastic compression of the retaining ring 26 to allow it to be placed in the groove of the inner hub as will be described in more detail below.

The retaining ring 26 includes a pair of legs 28. The legs 28 are also referred to as first and second legs 28. The first leg 28 depends into the bore and is adapted to engage the external retaining ring groove of the shaft as will be discussed below. The second leg 28 is adapted to engage the inner groove of the hub, as will be discussed below. These legs 28 comprise the retaining section of the retaining ring 26. The legs 28 are integrally connected at a terminal end 30. The legs 28 thus form a generally v-shape cross section. The legs 28 are configured so as to be flexible with respect to one another. That is, the legs 28 can flex or pivot relative to one another about the terminal end 30, as will be discussed more fully below. In the preferred embodiment, the legs 28 extend from the terminal end 30 at an angle of ninety degrees with respect to each other.

Figure 5:
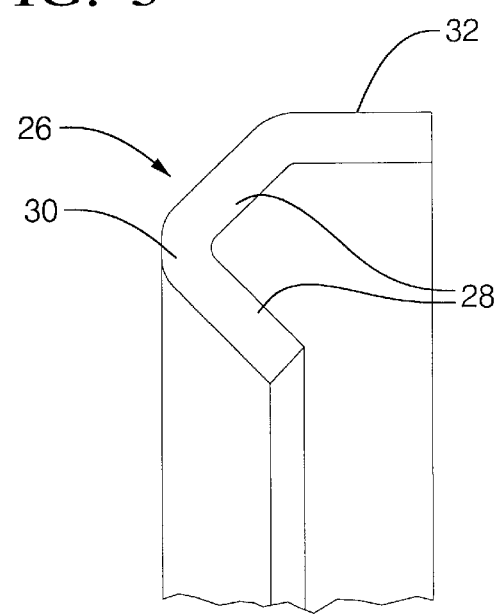
FIG. 5 is cross-sectional view of the ring of FIG. 4 partially broken away.

As can also be seen in FIG. 5, the retaining ring 26 also includes a third leg 32. The third leg extends outwardly from the distal end of the second of the legs 28. The third leg 32 is preferably angled with respect to the second leg 28 and is formed integrally therewith. The third leg 32 is necessary to prevent rotational movement of the retaining ring 26 during assembly, as will be discussed below.

FIGS. 6 and 7 generally show, at 34, an inner hub of a constant velocity joint. As shown, the inner hub 34 comprises a spider assembly for a Tripot type constant velocity joint. It will be appreciated that while a spider assembly is shown, the inner hub can 34 be any inner assembly such as a race for use with any other type of constant velocity joint such as, for example, the Rzeppa type.

The inner hub 34 includes an inner splined bore 36. The inner splined bore 36 is for receiving a splined shaft. The inner hub 34 includes an improved internal groove geometry, generally shown at 38 in FIG. 7 for receiving the retaining ring 26. The internal groove 38 is located at the outboard end of the inner splined bore 36 of the inner hub 34. Placing the groove 38 at the outboard end of the inner hub 34 allows for spline engagement before the retaining ring 26 becomes engaged. Further, placing the groove 38 at the outboard end of the inner hub 34 allows for full spline contact, without interrupt, between the shaft and the splined bore 36 of the inner hub 34.

The inner groove 38 has a flared or angled annular wall 40. The flared wall 40 extends outwardly from the outboard end of the inner splined bore 36. The flared wall 40 thus begins the inner groove 38. The flared wall 40 flares or angles outwardly to a diameter that is greater than the diameter of the inner splined bore 36. The flared wall is adapted to engage the second of the legs 28 of the retaining ring 26 as can best be seen in FIGS. 10 and 12. In the preferred embodiment, the flared wall 40 extends at an angle of approximately forty-five degrees from the inner splined bore 36. When the retaining ring 26 is received within the inner groove 38, at least a portion of the second leg 28 of the retaining ring 26 lies flat on the flared wall 40.

The inner groove 38 also includes an annular groove portion 42. The annular groove portion 42 preferably has a constant diameter which diameter is greater than that of the inner splined bore 36. The annular groove portion 42 extends from the terminal point of the flared wall 40. The annular groove portion 42 is for engaging the third leg 32 of the retaining ring 26. Preferably, the third leg 32 lies flat against the annular groove portion 42, as best seen in FIGS. 10 and 12.

Outboard of the annular groove portion 42 is a shallow groove portion 44. The shallow groove portion 44 comprises an annular groove of a constant diameter. Preferably, the diameter of the shallow groove portion 44 is greater than that of the inner splined bore 36, but less than the diameter of the annular groove portion 42. This shallow groove portion 44 thus provides a stop surface 46 (FIG. 7) which engages the terminal end of the third leg 32 to prevent the retaining ring from moving outwardly of the inner hub 34 when the retaining ring is seated in the inner groove 38.

Finally, an annular outboard flared surface 48 is provided. The annular outboard flared surface 48 extends outwardly from the wall of the shallow groove portion 44. The flared surface 48 extends at an angle with respect to the shallow groove portion 44. The angle increases the diameter from a relatively smaller diameter inwardly of the outboard end of the inner hub 34 to a relatively larger diameter at the outermost end of the inner hub 34. This flared surface 48 facilitates insertion of the retaining ring into the groove 38, by providing a cam surface that aids in compressing of the retaining ring 26 while the retaining ring 26 is being inserted into the inner groove 38.

FIGS. 8 and 9 show the terminal end of a shaft 50 used in connection with a constant velocity joint. The shaft 50 is commonly known as a halfshaft. The shaft 50 includes a splined portion 52. The splines on the shaft 50 engage the splines on the inner bore 36 to transfer rotational movement of the shaft 50 to the inner hub 34.

The shaft 50 includes an external retaining ring groove generally shown at 54. The external retaining ring groove 54 is located at the terminal end of the shaft 50 and is adapted to receive the retaining ring 26. The groove 54 includes an inwardly flared annular wall or surface 56. The flared surface 56 extends from the outer end of the splined portion 52 of the shaft 50. The flared surface 56 thus begins the external groove 54. The flared surface 56 flares or angles inwardly to a diameter that is less than the diameter of the shaft 50.

The flared surface 56 is adapted to engage the first or dependent of the legs 28 of the retaining ring 26 as can best be seen in FIG. 16. In the preferred embodiment, the flared surface 56 extends at an angle of approximately forty-five degrees from the shaft 50. Thus, when the retaining ring 26 is received within the external groove 54, at least a portion of the first leg 28 of the retaining ring 26 lies flat on the flared surface 56.

The external retaining ring groove also includes a bottom surface 58. The bottom surface 58 is the deepest portion of the external retainer ringer groove 54. The bottom surface 58 preferably provides a groove area that has a constant diameter, which is less than the diameter of the splined shaft 50. The bottom surface 58 extends outwardly from the terminal point of the flared surface 56. As can best be seen in FIG. 16, the bottom surface 58 provides an area in the groove for the leg 28 of the retaining ring 26 to seat when the assembly is assembled.

The bottom surface 58 terminates at a lip 60. Preferably, the lip 60 is an upstanding wall that is perpendicularly disposed to the bottom surface 58. The lip 60 provides a contact or stop surface for the retaining ring 26 to prevent the spline shaft 50 from being removed from the inner hub 34 under normal operating conditions.

Finally, the splined shaft 50 includes an external cam portion 62. The cam portion 62 is adapted to engage one leg 28 of the retaining ring 26 as the splined shaft 50 is being inserted into the inner hub 34. The cam portion 62 deflects the leg 28 to allow passage of the splined shaft 50 into the inner hub 34. A flat surface 64 separates the cam portion 62 from the lip 60. The flat portion 64 eliminates a sharp corner at the interface of the cam portion 62 and the lip 60. It will be appreciated that the cam portion 62 may extend all the way to the lip 60 and thereby eliminate the flat surface 64.

In order to secure the splined shaft 50 with the inner hub 34, the retaining ring 26 is inserted into the inner grove 38 in the splined bore 36. The retaining ring 26 is oriented such that the third leg 32 engages the annular groove portion 42. The second of the legs 28 seats against the flared wall 40. The first of the legs 28 depends from the groove 38 into the opening of the splined bore 36.

The retaining ring 26 is retained in the groove 38 by a spring forced exerted by the ring 26. More specifically, the retaining ring 26 preferably has a diameter slightly greater than the diameter of the inner groove 38. It will be appreciated, however, that the diameter can be the same or slightly less than that of the inner groove 38. The ring 26 can be radially compressed (because of the c-shape structure) to be inserted into the groove 38. The annular flared surface 48 provides a cam surface that aids in insertion of the ring 26 into the groove 38. More specifically, the second leg 28 of the retaining ring 26 engages the flared surface 48 during insertion of the ring 26 into the inner groove 38. The ring 26 is compressed as it is pressed forwardly into the groove 38. Once the walls 28,30 of the retaining ring 26 pass the shallow groove portion 44, the ring 26 expands radially outwardly and is seated in the inner groove 38 in the manner set forth above.

FIGS. 11 through 16 show the splined shaft 50 being inserted into the inner hub 34 containing the retaining ring 26. To insert the shaft 50, the leading or outboard edge of the shaft 50 (having the groove 54 thereon) is inserted into the hub 34. The splined portion 52 of the shaft 50 engages the splines of the inner splined bore 36 of the inner hub 34. This spline engagement occurs before the retaining ring 26 becomes engaged.

As shown in FIGS. 11 and 12, as the shaft 50 is inserted through the hub 34, the cam portion 62 of the shaft 50 engages the first or depending leg 28 of the retaining ring 26. As the shaft 50 is inserted, the cam surface 62 deflects the depending leg 28 upwardly. The force that is applied to the depending leg 28 causing it to deflect, also tends to cause the retaining ring 26 to rotate in the groove 38. However, this force is transmitted through the third leg 32 to the annular wall 42. In this manner, the third leg 32 prevents the retaining ring 26 from rotating in the groove 38.

FIGS. 13 and 14 show further progression of the insertion of the shaft 50 into the inner splined bore 36. As best seen in FIG. 14, the depending leg 28 is shown in its most compressed state, relative to the other leg 28. Specifically, the leg 28 is engaging the flat surface 64 of the shaft 50. As in connection with the description for FIG. 12, the force applied to the retaining ring 26 is transmitted to the third leg 32 which is seated against the annular wall 42 to prevent rolling over or rotational movement of the retaining ring 26 within the groove 38.

When the depending leg 28 has cleared the flat surface 64, it uncompresses in spring-like fashion, and a portion of the depending leg 28 seats against the flared wall surface 56 in the external retaining ring groove 54. In this fully assembled or retained position, the depending leg 28 is open (uncompressed) into the external retaining ring groove 54 in the splined shaft 50. Retention of the inner hub 34 to the splined shaft 50 is maintained by creating opposing forces along the depending leg 28. If the shaft 50 attempted to be pulled out of the splined bore 36, the depending leg 28 will engage the lip 60 to prevent removal of the shaft 50. Conversely, the shaft can no longer be inserted because the depending leg 28 engages the inwardly flared surface 56 to prevent further movement of the shaft 50 into the bore 36. Therefore, once the depending leg 28 is in the retained position, axial movement between the shaft 50 and hub 34 is prevented.

In the preferred embodiment, the retaining ring is designed to allow for disassembly at a predefined load. That is, the retaining ring 26 is designed to allow it to shear into two or more pieces without causing damage to either of the grooves 38 or 54. The ring is designed so that the predetermined load required to shear the retaining ring is greater than the load normally applied when the constant velocity joint is in operation. This design allows for removal of the spline shaft to allow maintenance of the constant velocity joint.

The invention is described in an illustrative manner, and it is to be understood that the terminology which has been used is intended to be in the nature of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A retainer for the interior assembly of a universal joint comprising:

a shaft having a splined portion and having an external groove outward of said splined portion, a hub member defining a bore having splines and adapted for mating engagement with said splined portion of said shaft, said hub member including an internal groove outward of said splines; and a retaining ring having first and second legs that are flexible with respect to each other, said first leg engaging said external groove of said spline shaft and said second leg engaging said internal groove of said hub member to thereby prevent relative axial movement between said shaft and said hub.

2. A retainer as set forth in claim 1 wherein said first and said second legs are connected at a terminal end to form a generally V-shape cross section.

3. A retainer as set forth in claim 2 wherein said retaining ring further comprises a third leg extending from a distal end of said second leg for engaging said internal groove of said hub member.

4. A retainer as set forth in claim 3 wherein said internal groove of said hub comprises a flared wall extending outwardly from said bore at an angle relative thereto and an annular groove portion extending from said flared wall, said second leg of said retaining ring engaging said flared wall.

5. A retainer as set forth in claim 4 wherein said third leg of said retaining ring engages said annular groove.

6. A retainer as set forth in claim 4 wherein said external groove of said shaft includes a flared wall surface extending outwardly from said spline portion at an angle relative thereto and a bottom surface extending from said flared wall surface, said first leg of said retaining ring engaging said flared wall surface.

7. A retainer as set forth in claim 6 wherein said shaft includes a stop surface outward of said bottom surface and a cam portion forward of said stop surface.

8. A retainer as set forth in claim 7 wherein said shaft includes a flat annular surface disposed between said stop surface and said cam portion.

9. A retainer as set forth in claim 7 wherein said hub includes shallow groove portion outward of said annular groove portion and an annular outboard flared surface outward of said shallow groove portion and angled with respect thereto.

10. A retainer for the interior assembly of a universal joint comprising:

a shaft having a splined portion and having an external groove, said groove including a flared wall surface extending at an angle relative to said splined portion and a bottom surface extending from said flared wall surface;

a hub member defining a bore having splines and adapted for mating engagement with said splined portion of said shaft, said hub member including an internal groove including a flared wall extending outwardly from said bore at an angle relative thereto and an annular groove portion extending from said flared wall; and a retaining ring having first and second legs that are flexible with respect to each other, said first leg engaging said flared wall surface of said shaft and said second leg engaging said flared wall of said hub, to thereby prevent relative axial movement between said hub and said shaft.

11. A retainer as set forth in claim 10 wherein said retaining ring further comprises a third leg extending from a distal end of said second leg for engaging said annular groove portion of said hub.

12. A retainer as set forth in claim 10 wherein said first and said second legs connect at a terminal end to form a generally v-shape cross section.

13. A retainer as set forth in claim 12 wherein said shaft includes a stop surface outward of said bottom surface and a cam portion forward of said stop surface.

14. A retainer as set forth in claim 13 wherein said shaft includes a flat annular surface disposed between said stop surface and said cam portion.

15. A retainer as set forth in claim 13 wherein said hub includes shallow groove portion outward of said annular groove portion and an annular outboard flared surface outward of said shallow groove portion and angled with respect thereto.

16. A retainer for the interior assembly of a universal joint comprising:

a shaft having a splined portion and having an external groove outward of said splined portion, said groove including a flared wall surface extending at an angle relative to said splined portion and a bottom surface extending from said flared wall surface, said shaft further including a stop surface extending from said bottom surface, and a cam portion forward of said stop surface;

a hub member defining a bore having splines and adapted for mating engagement with said splined portion of said shaft, said hub member internal an internal groove outward of said splines, said internal groove including a flared wall extending outwardly from said bore at an angle relative thereto and an annular groove portion extending from said flared wall, said hub member further including a shallow groove portion outward of said annular groove portion and an annular outboard flared surface outward of said shallow groove portion and angled with respect thereto; and a retaining ring having first and second legs that are flexible with respect to each other, said first leg engaging said flared wall surface of said shaft and said second leg engaging said flared wall of said hub, to thereby prevent relative axial movement between said hub and said shaft, said retainer ring further including a third leg extending from a distal end of said second leg and engaging said annular groove portion of said hub.

17. A retainer as set forth in claim 16 wherein said shaft includes a flat annular surface disposed between said stop surface and said cam portion.

18. A method of securing a splined shaft with a splined hub comprising the steps of:

providing a shaft having a splined portion thereon and an external groove including a flared wall surface extending at an angle relative to said splined portion and a bottom surface extending from said flared wall surface;

providing a hub member defining a bore and having splines, said hub including an internal groove including a flared wall extending outwardly from said bore at an angle relative thereto and an annular groove portion extending from said flared wall;

placing a retaining ring having first and second legs into said internal groove of said hub such that said second leg engages said flared wall and said second leg depends downwardly therefrom and into said bore;

inserting said shaft into said hub member such that said splined portion of said shaft engages said splines of said bore and further inserting said shaft into said hub such that said shaft engages said first leg of said retaining ring and deflects said first leg relative to said second leg and continuing such insertion until said first leg engages said flared wall surface of said shaft.

19. A method as set forth in claim 18 further comprising the step of providing a retaining ring having a third leg extending from a distal end of said second leg, and placing said retaining ring in said internal groove of said hub such that said third leg engages said annular groove portion.

20. A method of securing a splined shaft with a splined hub comprising the steps of:

providing a shaft having a splined portion thereon and an external groove outward of said splined portion;

providing a hub member defining a bore and having splines, said hub including an internal groove outward of said splines;

placing a retaining ring having first and second legs into said internal groove of said hub such that said second leg depends downwardly therefrom and into said bore;

inserting said shaft into said hub member such that said splined portion of said shaft fully engages said splines of said bore prior to engagement of said retaining ring in said external groove of said shaft; and further inserting said shaft into said hub such that said shaft engages said first leg of said retaining ring and deflects said first leg relative to said second leg and continuing such insertion until said first leg engages said external groove of said shaft.

21. A method as set forth in claim 20 further comprising the step of providing a hub member including an internal groove including a flared wall extending outwardly from said bore at an angle relative thereto and an annular groove portion extending from said flared wall.

22. A method as set forth in claim 21 further comprising the step of providing a shaft having an external groove including a flared wall surface extending at an angle relative to said splined portion and a bottom surface extending from said flared wall surface.

23. A method as set forth in claim 22 further comprising the step of inserting said retaining ring in said internal groove such that said second leg engages said flared wall and said second leg depends downwardly therefrom and into said bore.

24. A method as set forth in claim 23 further comprising the step of continuing insertion of said shaft into said hub until said first leg engages said flared wall surface of said shaft.

25. A method as set forth in claim 24 further comprising the step of providing a retaining ring having a third leg extending from a distal end of said second leg, and placing said retaining ring in said internal groove of said hub such that said third leg engages said annular groove portion.

* * * * *